Dec. 25, 1962 T. W. PIERSON 3,069,970
SCREEN, PROJECTOR, AND SIGN ARRANGEMENT FOR OUTDOOR ADVERTISING
Filed Nov. 16, 1959 2 Sheets-Sheet 2

INVENTOR.
TOBIE WILLIAM PIERSON
BY *Lothrop & West*
*Attorneys*

United States Patent Office 3,069,970
Patented Dec. 25, 1962

3,069,970
SCREEN, PROJECTOR, AND SIGN ARRANGE-
MENT FOR OUTDOOR ADVERTISING
Tobie William Pierson, 6109 Burns Way,
Sacramento 24, Calif.
Filed Nov. 16, 1959, Ser. No. 853,425
2 Claims. (Cl. 88—24)

This invention relates to improvements in outdoor advertising billboards of the type particularly adapted, though not necessarily limited in its use, for outdoor advertising.

Outdoor advertising has utilized rear projection screens from time to time in the past. However, several factors have militated against their widespread use.

The large screens used heretofore for rear projection purposes have moved with the wind, changing constantly the focal distance in contrast to the focal length of the projector's lens and thus blurring the projected image.

Another factor which has heretofore reduced the popularity of rear projection screens is that they could only be used effectively at night, with the result that during the day the ordinarily expensive advertising space was unused and therefore wasted.

It is therefore an object of the invention to provide an outdoor advertising structure which makes maximum utilization of the available space.

It is a further object of the invention to provide an outdoor advertising structure which is durable and long-lived.

It is yet a further object of the invention to provide an outdoor advertising structure having a rear projection screen which is strong and rigid and which, therefore, maintains over its entire surface a constant focal distance with respect to the projector's lens.

It is still another object of the invention to provide an advertising structure in which the rear projection screen is provided with a resilient backing during the daylight hours and which therefore adds greatly to the service life of the screen.

It is another object of the invention to provide a generally improved outdoor advertising structure.

Other objects, together with the foregoing are attained in the embodiment described in the following description and shown in the accompanying drawings in which.

Figure 2:
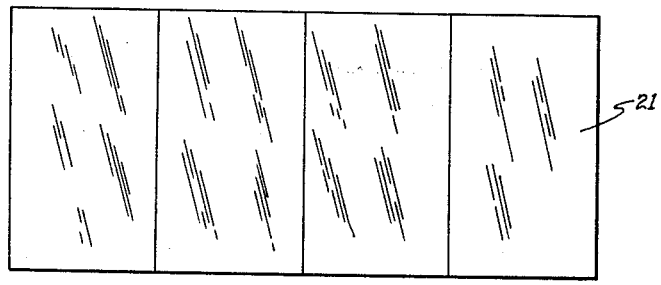
FIGURE 2 is a front elevational view of the translucent screen.

The outdoor advertising installation of the invention, generally designated by reference numeral 11, comprises a working area 12, or room, or enclosure, defined by a pair of side walls 13, a ceiling 14, a floor 15, an interior end wall 16 and an outwardly facing or exterior end wall 17. Securely mounted in an appropriately dimensioned opening 18 in the end wall 17 is a large planar element, or panel, termed a rear projection screen 21. FIGURE 2 is a vertical front view of the rear projection screen. This screen has four clear glass panels, ½ inch in thickness, 10 feet high by 6 feet wide bonded together in three places with special clear cement, to make one solid glass panel 10 feet high by 24 feet wide by ½ inch thick. This panel, as stated above, is set into, bonded and sealed in one end of an upper section or room preferably of a two story building. A sheet of translucent screen material suitable for rear projection is bonded by a clear bonding agent to the inside face of the glass to make a rear projection screen. A fully automatic 4" x 5" 2000 or 5000 watt slide projector 20 is mounted on the floor of the upper section of the building, centered approximately 30 feet 2 inches from the screen. Using suitable slides, advertising messages are flashed onto the screen at seven second intervals.

Bonding together of the four panels of glass to construct this screen is necessary due to limitations of size in which plate glass may be procured. While the preferred form of construction is shown at the present time, it is not to be construed to limit this screen to this size or type of construction in the event the plate glass becomes available in larger sizes, or other plate glass has to be substituted.

Figure 1:
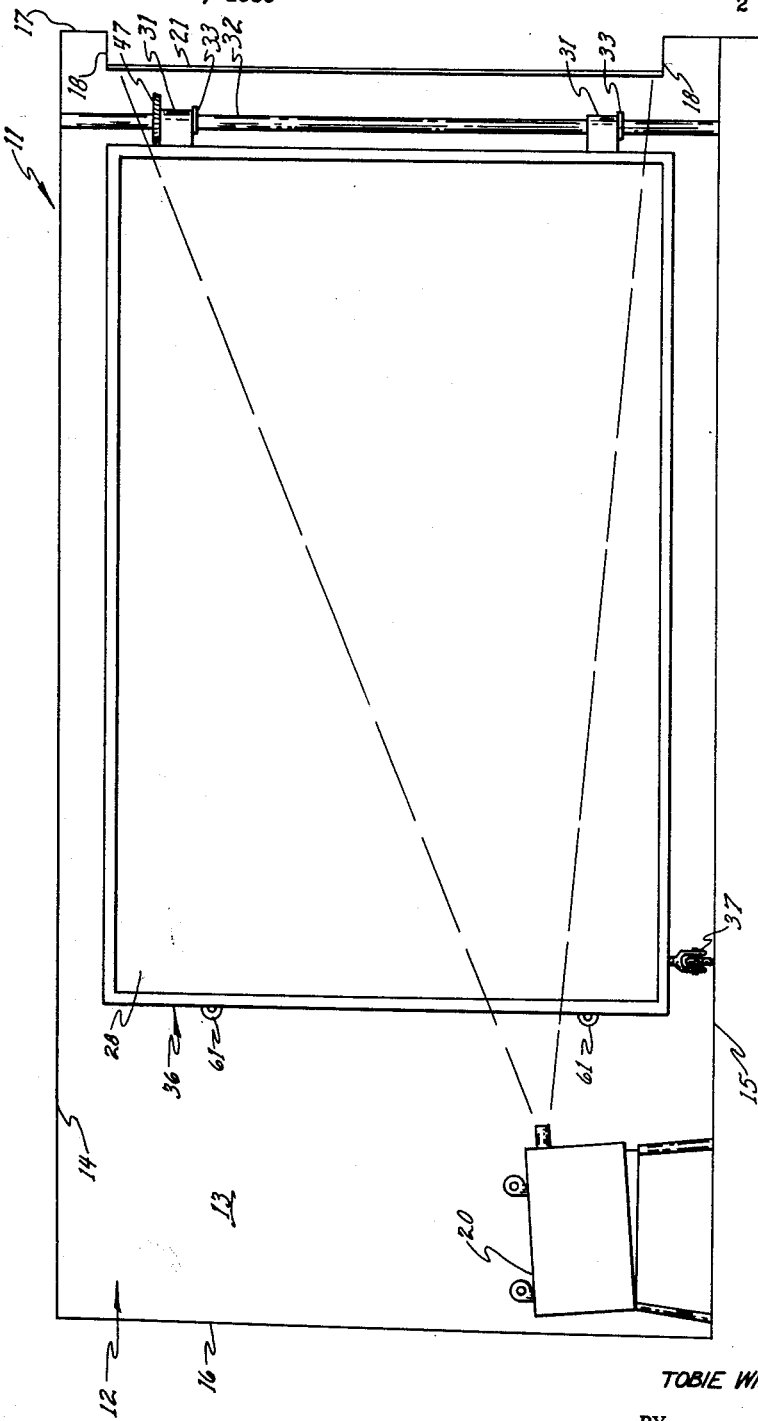
FIGURE 1 is a side elevational view showing the interior of a building room having installed at the right-hand end a translucent screen and at the left-hand end an advertising projector, the swinging framework being shown in open position against the far wall.
Figure 3:
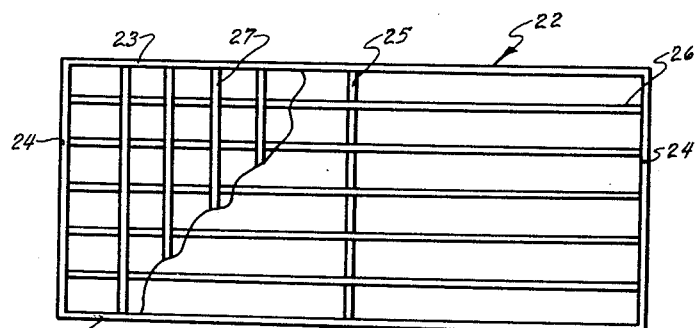
FIGURE 3 is front elevational view showing the lattice construction of the swinging framework, portions of the lattice being broken away more clearly to reveal details of construction.

FIGURE 3 illustrates certain structural details of the aluminum latticework including top and bottom horizontal members 23 and end members 24, a brace 25 and a plurality of intermediate horizontal members 26 with vertically extending members 27 upon which foam rubber is secured. As appears more clearly in FIGURES 1 and 4 of the drawings, one side of the latticework frame is provided with a pair of hinge members 31 pivotally mounted on a vertical pipe 32 so that this latticework frame as a whole may be rotated about said vertical pipe between its daylight and night-time operating positions. This framework is approximately 10 feet high by 24 feet wide by 6 inches thick without the foam rubber and canvas. However, any desired size may be constructed. It is to be understood the outside dimensions of this framework are slightly smaller than the outside dimensions of the rear projection screen to enable the framework to mesh against the rear projection screen.

Mounted on the front or face of the framework, as by suitable bonding, is a sheet of foam rubber. Covering the foam rubber, in turn, is a sheet of canvas having painted thereon the advertising message for use during the daylight hours. The edges of the canvas are attached to the edges of the framework as by fastening hooks.

A useful characteristic of the translucent rear projection screen is that it will pass through it, to the other side, an image or a picture pressed tightly against one side. Consequently, during the daylight hours, by swinging the framework so that the painted canvas presses against the inside of the screen, the message on the canvas can be read from the outside. The foam rubber serves not only to hold the canvas tightly against the screen so that all portions of the message can be read with equal clarity, but it also acts as a resilient buffer to back the screen against buffeting by the elements, particulraly strong gusts of wind.

Figure 4:
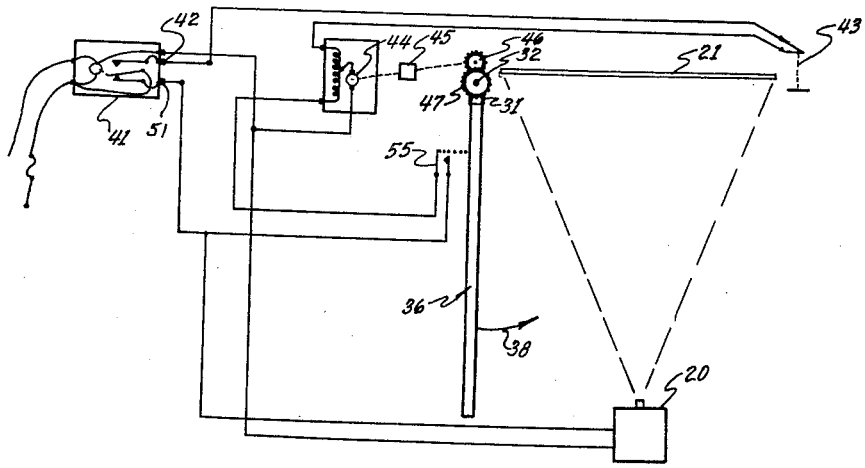
FIGURE 4 is a semi-diagrammatic plan view of the installation, and including a wiring diagram illustrating the interconnection between various of the major components of the device.

Any suitable automatic actuating mechanism may be provided but a simple and efficient mechanism will be now described. Referring to FIGURE 4, electrical power is supplied to a single-pole double-throw interval timer 41 and at preset time, power will be supplied to terminal 42. Current will pass through normally closed contacts of limit switch 43 to a reversible, slip clutch electric motor 44, which is coupled to a gearbox 45, the outside ring gear 46 of the gearbox meshing with a large ring gear 47 mounted and anchored on the upper portion of the top offset hinge of the dayscreen framework. This will enable motor and gearbox to move framework in the direction indicated on the drawing until it contacts limit switch 43. This opens limit switch 43 stopping motor 44. There is no power supplied to projector until the interval timer 41 transmits power to terminal 51. This will be preset in the timer. Power supply on terminal 51 allows current to pass to the projector 20 and also to the now normally closed contacts of limit switch 55. The motor 44 rotates in the opposite direction and moves framework to the position shown in the drawing. Limit switch 55 is now opened completing one complete cycle. The framework can be held in closed position by any commercial electrical lock. Two eyeplates 61 bolted to the right hand side of the framework and two tension clamps not shown mounted on the right hand wall of the building opposite the eyeplates provide a tension lock for manual operation.

The various mechanisms and structures set forth in this paragraph are each standard, commercially available items and their electrical and mechanical connections will be apparent to anyone skilled in the art after reference is had to FIGURE 4 and the foregoing description.

What is claimed as new is:

1. In an outdoor advertising structure, the combination of a room having an outside wall with an opening covering substantially its entire area, a rigid translucent screen disposed within and closing the opening in said wall, a rectangular frame having dimensions substantially conforming with the dimensions of said translucent screen pivotally mounted at one side of said opening, said frame being adapted and arranged to swing about its pivotal mounting between a first position angularly removed from said screen and a second position in parallel relation with respect to said screen, motor means for swinging said frame between its first and second positions, a source of power for said motor, an image projector located within said room and connected to said source of power for projecting a picture image upon said translucent screen, a timing means in said power circuit for limiting the operation of said projector to certain periods of time, limit switches in the circuit of said motor means responsive to the position of said frame for stopping said motor means as said frame swings into its first and second position, and characterized by the fact that said frame carries a sheet of foam rubber over which a sign carrying sheet of canvas is stretched, whereby said sign carrying sheet of canvas will be pressed firmly against the back of said rigid translucent screen throughout the area thereof by said sheet of foam rubber when said frame is in its second position.

2. In an outdoor advertising structure, the combination of claim 1 characterized further by the fact that the advertising sign message applied to the canvas upon said frame will be viewable through said translucent screen when said frame is in its second position.

References Cited in the file of this patent

UNITED STATES PATENTS

| | | |
|---|---|---|
| 1,216,380 | Troeger | Feb. 20, 1917 |
| 1,252,248 | Davis et al. | Jan. 1, 1918 |
| 1,835,374 | Burchett | Dec. 8, 1931 |
| 2,180,113 | Land | Nov. 14, 1939 |
| 2,685,817 | Freeman | Aug. 10, 1954 |
| 2,796,802 | Felice | June 25, 1957 |